May 19, 1970     M. POLOUJADOFF     3,513,338

VEHICLES WITH LINEAR INDUCTION MOTORS

Filed Nov. 7, 1968

INVENTOR
MICHEL POLOUJADOFF

By Stevens, Davis, Miller & Mosher
ATTORNEYS

United States Patent Office 3,513,338
Patented May 19, 1970

3,513,338
VEHICLES WITH LINEAR INDUCTION MOTORS
Michel Poiujadoff, Grenoble, France, assignor to Merlin Gerin (Societe Anonyme), Grenoble, France
Filed Nov. 7, 1968, Ser. No. 774,060
Claims priority, application France, Nov. 17, 1967, 128,777
Int. Cl. H02k 41/02, 41/04
U.S. Cl. 310—13
1 Claim

ABSTRACT OF THE DISCLOSURE

Vehicle propelled by an electric linear motor having an elongated stationary inductor producing a magnetic travelling field. A coil is located in the vehicle to be traversed by the flux of said field and to furnish the auxiliary service power in the vehicle.

---

The present invention relates to a system including a vehicle which is propelled along a given linear path by a linear electric motor which comprises, arranged along the said path, an elongated stationary inductor fed by a source of alternating current and producing a travelling magnetic field which cooperates with a movable armature which is rigidly connected with said vehicle and capable of following said path.

The propulsive power is produced by stationary inductors, this solution avoiding conventional brushes or other pick-up means, which transmit electric current to the movable unit or vehicle, and impose limitations which are particularly serious at high speeds. It would be very regrettable to again introduce this same problem of picking up current with regard to the auxiliary service power in the vehicles themselves.

The present invention is characterized by the fact that on the said movable vehicle there is arranged a winding which is traversed by the magnetic flux of the said travelling field created by the said inductor in such a manner that an electromotive force is induced in the winding by the said inductor, which may be utilized as auxiliary service power in the vehicle itself.

The requirements for auxiliary service power which consist essentially in power for the heating, lighting and possibly producing air cushions for lifting of the vehicle are relatively constant and small as compared with the propulsive power.

Therefore, there is no major drawback in taking, in accordance with the present invention, the energy necessary on the vehicle from the energy which is transmitted by the inductor.

Naturally, the removal of this power has an effect on the speed of the vehicle, but this effect will be relatively slight and, in any event, can be allowed for in the design.

Other advantages and characteristics will become evident from the following description of two embodiments of the invention shown in the accompanying drawing given solely by way of illustration and not of limitation. In the drawing.

Figure 1:
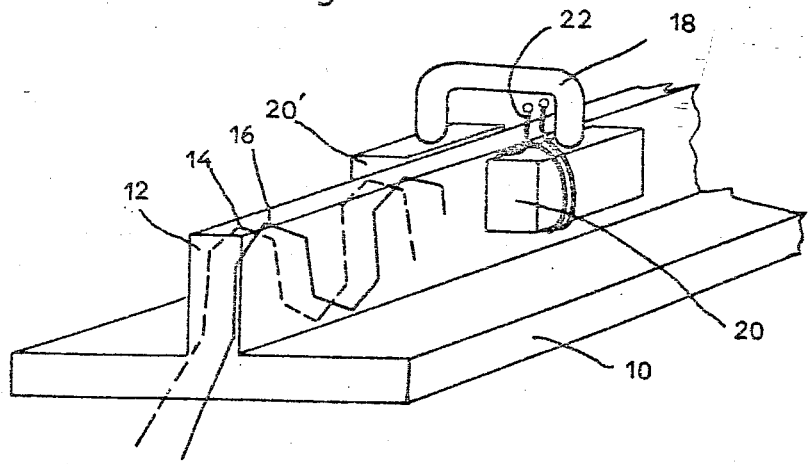
FIG. 1 is a schematic perspective view of a vehicle with linear motor in accordance with the invention.

Referring to FIG. 1, a stationary rail 10 having the shape of an inverted T has a web 12 in which there are embedded polyphase induction coils 14, 16 which produce a sliding or travelling field in the direction of the rail 10 when fed by a polyphase current, in the manner well known to those skilled in the art. A vehicle 18 straddles the web 12 of the rail 10 and is capable of moving along said rail 10 under the action of propulsive forces produced by the travelling magnetic field cooperating with an armature, schematically represented by its magnetic circuits 20, 20' in FIG. 1, rigidly connected with the vehicle 18. Hovering and guiding of the vehicle 18 can be assured by cushions of air or any other means. The armature of the linear motor comprises windings (not shown), which may or may not be short-circuited, or is the seat of eddy currents in the conventional manner, and magnetic closure circuits 20, 20' for the lines of force. At least one of these magnetic circuits 20 bears a coil 22 traversed by the magnetic flux produced by the induction coils or conductors 14, 16. It can easily be seen that if the vehicle 18 is held stopped and the inductor 14, 16 is fed with an alternating current, an electromotive force will be induced in the coil 22 due to the variation of the flux passing through it. Electric power is thus available in the vehicle 18 by a simple magnetic pickup which avoids any brush or rubbing contact. This electromotive force is a function of the speed of displacement of the vehicle 18 with respect to the speed of passage of the travelling field. It should be noted that it would be zero in the theoretical limiting case of synchronism of the travelling field and the vehicle. Such temporary variations which occur may be compensated for by energy storage means, for instance storage batteries (not shown), of course combined with rectifiers, since the current induced is an alternating current.

The removal of energy by the coil 22 from the travelling field obviously affects the operation of the linear motor, but these removals of energy are relatively small as compared with the energies involved. Furthermore, the variations of these removals are not very great, and their influence on the speed of travel of the vehicle is practically negligible. Several coils 22 can be suitably arranged on the magnetic circuit so as a polyphase current is induced therein.

The energy induced in the coil 22 can serve to feed electricity to the auxiliaries of the vehicle, such as the heating devices, illuminating devices or air compressors, for instance for hovering and the like. In case of the use of an induction winding having a substantial distribution harmonic, one can contemplate effecting the traction by means of an armature having the fundamental pole pitch of the induction coil and removing the power by means of a coil on the armature having the pole pitch of the largest harmonic of said inductor. In this case, by means of the power taken from the secondary winding, a direct current can be passed through a rectifying system so as to synchronize the motor with respect to the fundamental sliding field in a coil of the armature.

Figure 2:
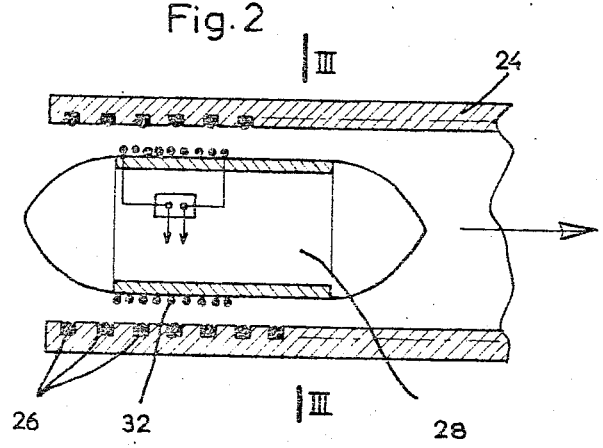
FIG. 2 is an axial cross section through a variant embodiment of the invention.
Figure 3:
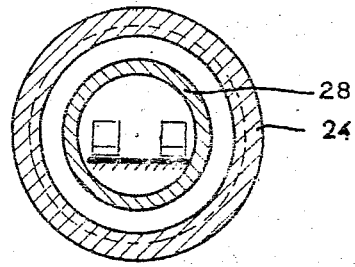
FIG. 3 is a section along the line III—III of FIG. 2.

The invention is, of course, by no means limited to the embodiment shown in FIG. 1. A variant embodiment is shown in FIGS. 2 and 3 in which the inductor 24 takes the form a tubular conduit whose inner face has grooves 26 therein receiving conductors of a coil, for instance a ring coil, which produces a travelling field when fed by a polyphase current in the customary manner. A cylindrical tubular armature 28 can move within the tubular inductor 24, guided by any suitable means, for instance means with air cushions. The tubular armature 28 may constitute, the frame of a vehicle moving along the path defined by the tubular rail 24. and propelled by the linear induction motor constituted by the inductor 24 and the armature 28. Such linear motors are well known to those skilled in the art and it is needless to describe them in further detail. A pickup winding 32 is wound on the armature 28 and it can easily be seen that it is traversed by the magnetic flux produced by the inductor 24 in a manner comparable to the secondary of a transformer of which the winding coil 24 would be the primary. This electromotive force induced in the pickup winding 32 is a function, as in the example illustrated by FIG. 1, of the sliding of the linear motor and in particular of a frequency which varies depending on the speed of the vehicle.

The invention is by no means limited to the embodiments which have been more particularly described.

What I claim is:

1. A vehicle driven by a linear induction motor, comprising: a tubular inductor extending along the vehicle's path of travel, means to generate a magnetic field which travels along the extent of said inductor, a tubular armature rigidly mounted on said vehicle and disposed within said tubular inductor, a toroidal pickup winding wound about said armature and rigidly connected thereto, whereby said magnetic field interacts with said armature to drive said vehicle while any cutting of lines of flux by said pickup winding as the result of the vehicle and said magnetic field not being perfectly synchronized, results in the generation of electrical power useful for auxiliary purposes in said vehicle.

References Cited
UNITED STATES PATENTS

| 2,638,347 | 5/1953 | Maggi | 310—12 X |
| 448,598 | 3/1891 | Wheeler et al. | 310—13 |

DONOVAN F. DUGGAN, Primary Examiner

U.S. Cl. X.R.

104—148